United States Patent
Philbrick

(10) Patent No.: US 6,462,779 B1
(45) Date of Patent: Oct. 8, 2002

(54) CONSTANT SPEED, VARIABLE RESOLUTION TWO-PHASE CCD

(75) Inventor: Robert H. Philbrick, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/028,006

(22) Filed: Feb. 23, 1998

(51) Int. Cl.[7] .............................................. H04N 5/335
(52) U.S. Cl. ....................................... 348/312; 348/315
(58) Field of Search ................................. 348/207, 294, 348/297, 298, 311, 312, 315, 317; 257/223, 230; 358/513, 514; H04N 5/335

(56) References Cited

U.S. PATENT DOCUMENTS

| | | | |
|---|---|---|---|
| 4,317,134 A | * | 2/1982 | Woo et al. .................. 348/312 |
| 4,554,585 A | | 11/1985 | Carlson |
| 5,326,997 A | * | 7/1994 | Nakanishi .................... 257/230 |
| 5,486,711 A | | 1/1996 | Ishida |
| 5,502,578 A | | 3/1996 | Smitt |
| 5,691,937 A | | 11/1997 | Ohta |
| 5,777,672 A | * | 7/1998 | Cazaux et al. .............. 348/316 |

* cited by examiner

*Primary Examiner*—Tuan Ho
(74) *Attorney, Agent, or Firm*—Peyton C. Watkins

(57) ABSTRACT

A linear image sensor comprising a linear array of photosites adjacent to a charge coupled device (CCD) that is preferably a two phase CCD with a transfer gate between the array of photosites and the CCD with an output amplifier situated at the end of the CCD. At least one of the phases is divided into a split phase having two sets of electrically isolated gates that can be operated as a single phase or as two independent phases. The linear sensor operates in a reduced resolution mode by summing charge packets from adjacent photosites wherein the split phase functions as essentially two alternating phases with the phase that is not split being held at a D. C potential.

14 Claims, 5 Drawing Sheets

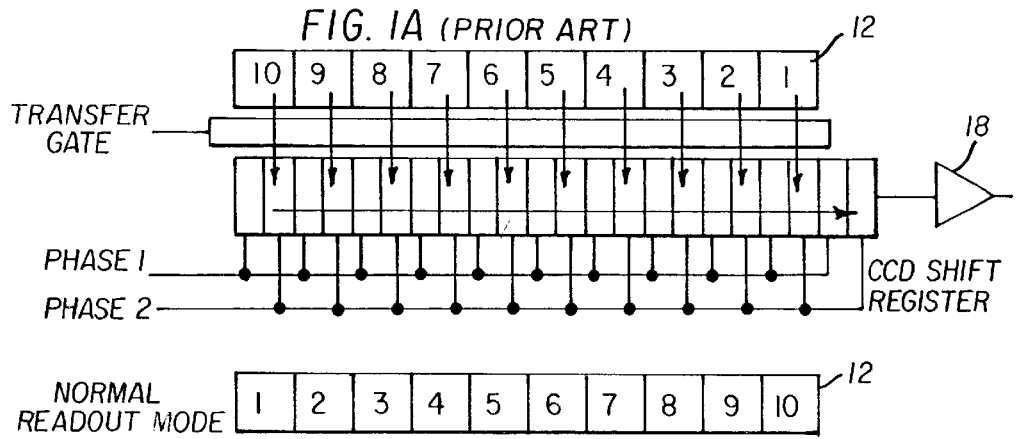
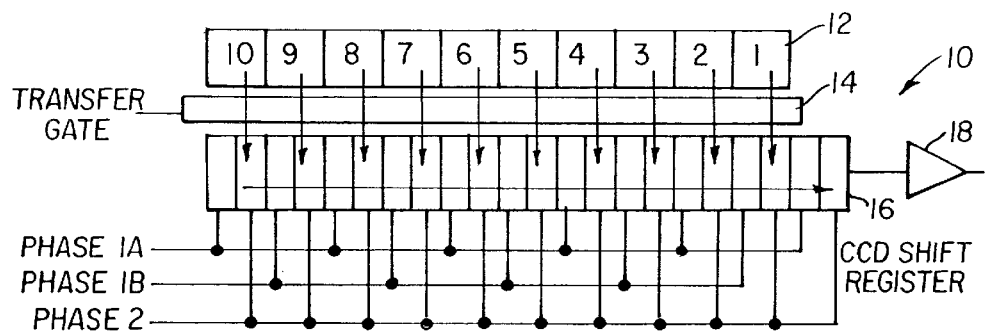
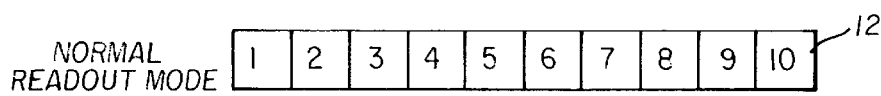
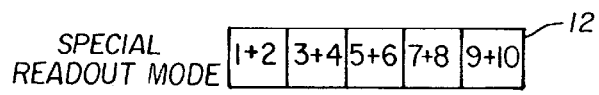

CONSTANT SPEED, VARIABLE RESOLUTION TWO-PHASE CCD

FIELD OF THE INVENTION

The present invention relates to semiconductor based image sensors, and more specifically, to linear sensors having variable resolution modes.

BACKGROUND OF THE INVENTION

The ability to offer a "fast preview" mode on scanning image systems is a feature many customers find desirable, as it offers a quick means for viewing the document or object to be scanned, and enables the document or object to be adjusted for an optimal scan much faster than can be achieved using "regular" scanning speeds and resolutions. In conventional CCD structures, it is possible to sum adjacent charge packets (i.e., pixels) on or before the charge detection node (e.g., floating diffusion) to obtain a spatial resolution of half the non summed image. However, this charge summing technique requires that the CCD clocks be operated at two times the full resolution rate to maintain the original pixel readout rate. In many high speed applications, such as the scanning of motion picture film in real-time, the CCD structures are operated at very high frequencies, often the maximum possible operating frequency the imager can support. Therefore, double the CCD clock rates is not an option. Another situation which sets a limit on the maximum pixel data rate is the analog-to-digital converter (ADC). High resolution scanners often use state-of-the-art ADCs in the 14 to 16 bit range. These converters typically have maximum conversion rates much lower than the maximum possible CCD clocking frequency, and hence limit the maximum pixel data rate. As in the case above, doubling the CCD clock frequency and summing adjacent pixels on the change detection node is necessary to obtain a ½ resolution image. Designing a CCD driver to support the ½ resolution, 2× CCD speed mode of operation yields a more expensive circuit and hence is very undesirable.

The two-phase CCD structure presented herein requires no additional CCD phases and only one additional pin. If the half resolution feature is not necessary in a given application, the CCD clocks are operated using conventional waveforms, so this feature would not cause existing systems to become more complicated.

SUMMARY OF THE INVENTION

The invention described herein is a charge coupled device (CCD) structure which permits both full and half spatial resolution images to be readout while maintaining a constant pixel readout rate and constant CCD clocking rates. In conventional CCD structures, it is possible to sum adjacent charge packets (i.e., pixels) on the charge detection node (e.g., floating diffusion) to obtain a spatial resolution of half the non summed image. However, this charge summing technique requires that the CCD clocks be operated at two times the full resolution rate to maintain the original pixel readout rate. In many high speed applications, such as the scanning of motion picture film in real-time, the CCD structures are operated at very high frequencies, often the maximum possible operating frequency. Therefore, double the CCD clock rates is not an option. The CCD structure presented requires no additional CCD phases and only one additional pin. If the half resolution feature is not necessary in a given application, the CCD clocks are operated using conventional waveforms, so this feature would not cause existing systems to become more complicated.

This invention can be used on both linear and area CCD based image sensors. It does require one additional clock signal (pin) per CCD. When operating the CCD in the half resolution mode, some of the CCD clocks need to be operated at above normal voltage levels.

ADVANTAGES OF THE INVENTION

The novel CCD architecture described herein offers several advantages over conventional CCD structures, as summarized below:

1. Allows half resolution images to be output using constant speed CCD clocks and ~½ the total line period.
2. Allows scanning applications to perform half resolution scans at approximately half the full resolution rate.
3. Requires only one additional input clock (pin).
4. If not used, the CCD structure is operated using conventional input clocks, so no changes required.
5. When implemented in a color multi-channel linear imager, this CCD structure enables programmable color resolution.
6. Can be used on both one and two dimensional CCD image sensors.

BRIEF DESCRIPTION OF THE DRAWINGS

FIG. 1A is a diagram of a prior art linear sensor;

FIG. 1B is time based representation of the pixel readout of FIG. 1A;

FIG. 2A is a diagram of a linear sensor employing the present invention;

FIG. 2b is time based representation of the pixel readout of FIG. 2A

FIG. 2C is time based representation of the pixel readout for a half resolution mode of operation for FIG. 2A

Figures 3, 4:
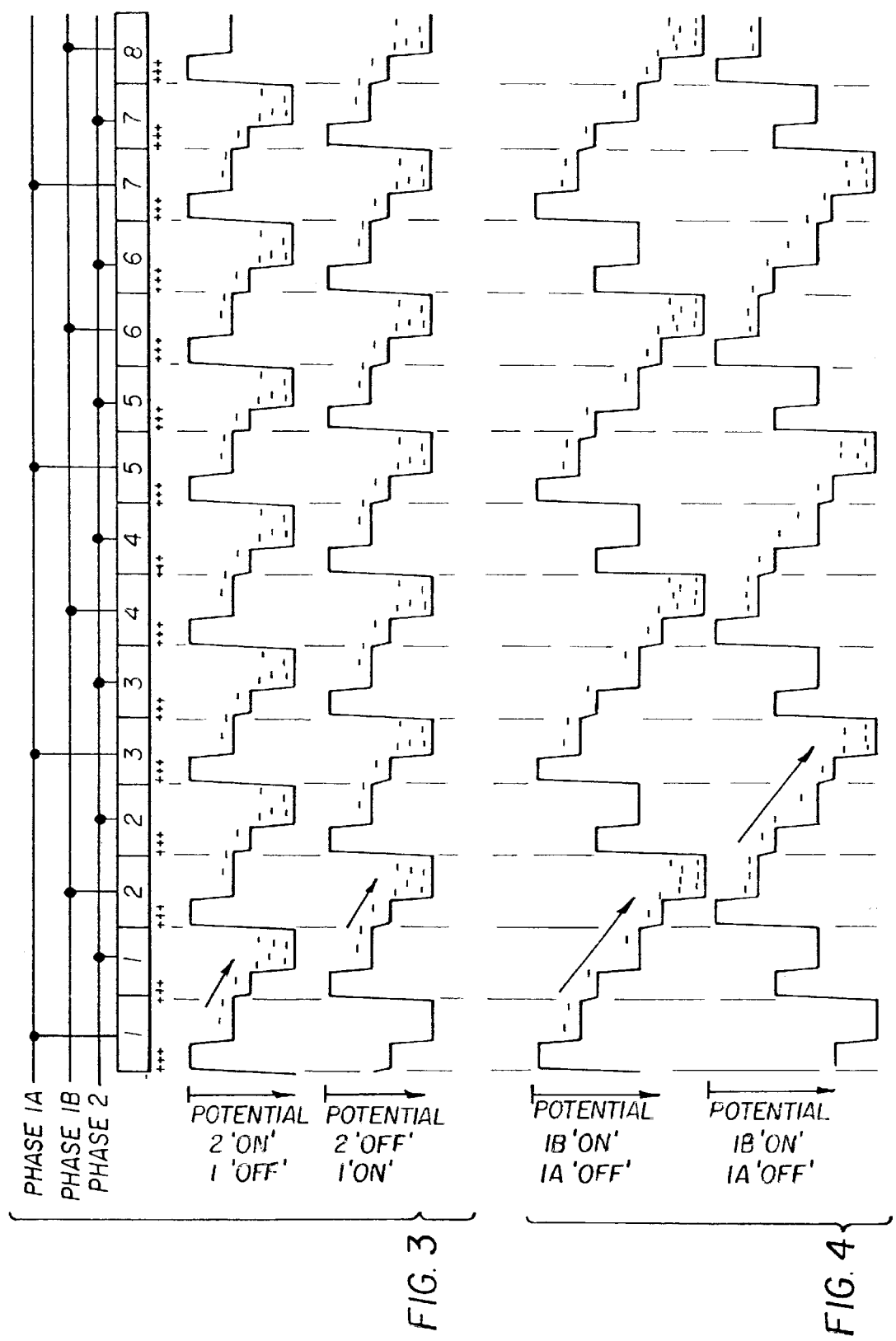
FIG. 3 is an electrostatic diagram for full resolution mode of operation of the linear sensor of the present invention shown in FIGS. 2A and 2B.
FIG. 4 is an electrostatic diagram for half resolution mode of operation of the linear sensor of the present invention shown in FIGS. 2A and 2C.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE INVENTION

The linear image sensor 10 as illustrated in FIG. 2A has ten pixels 12. While only ten pixels 12 are shown it should be understood that many thousands of pixels can be used in a single linear array and the ten pixel embodiment shown in FIG. 2A is for the purposes of illustration only to demonstrate the new CCD structure. Shown in FIG. 2A are the ten photosites 12; a vertical transfer gate 14, which transfers the integrated photogenerated charge in the photosites into the adjacent CCD structure 16 when the appropriate bias is applied; a 'split' two-phase CCD structure having the first phase divided into phase 1A and 1B; and a charge-to-voltage conversion amplifier 18. To simplify the diagrams, the metal light shielding normally incorporated into linear image sensors to shield all areas except the photosites is not shown in the Figures.

The 'split' two-phase CCD structure is formed by dividing the phase 1 gates into two groups: one consisting of the odd gates (phase 1A), and the other made up of the even gates (phase 1B).

Figure 5:
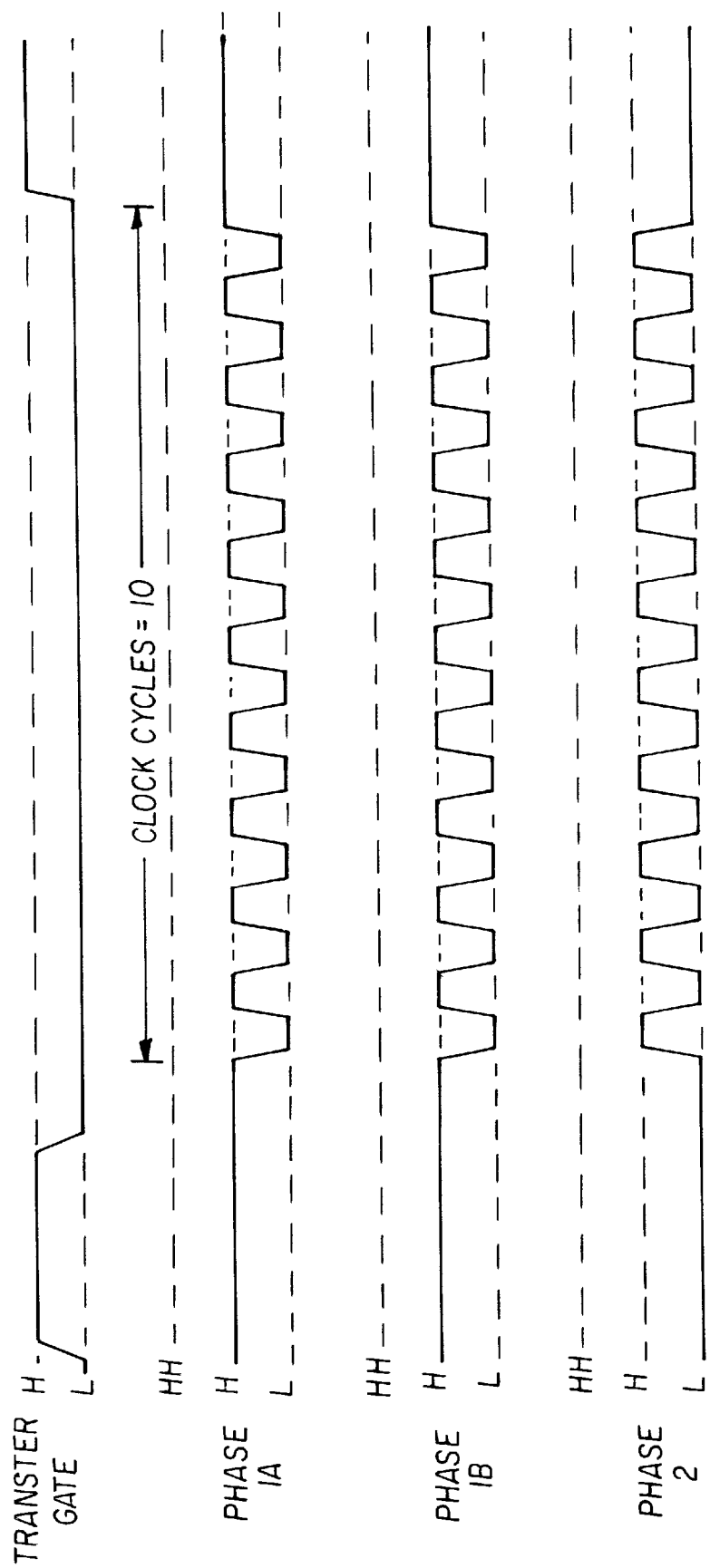
FIG. 5 is a timing diagram for the full resolution clocking of the present invention as shown in FIG. 2A.

In a normal operating mode as shown in FIG. 2B, FIG. 3 and FIG. 5, (i.e., full spatial resolution mode) the phase 1A and phase 1B gates are both driven with a common clocking signal, and the phase 2 gates are driven with a clocking signal which is the invert of phase 1. This normal operating mode timing is shown in FIG. 5 and the corresponding electrostatic channel potential diagrams under the CCD phase gate electrodes are shown in FIG. 3. The numbers shown within the electrostatic diagram of FIG. 3 represent photogenerated charge, with the number indicating the photosite associated with the photon absorption event. That is, a '1' indicates an electron liberated by an incident photon striking the imager in the photosensitive area defined by photosite 1, and a '2' represents an electron originating from photosite 2, and so on.

The pixel readout configuration in the normal operating mode is illustrated in FIG. 2B, under the 'Normal Readout Mode' label.

Figure 6:
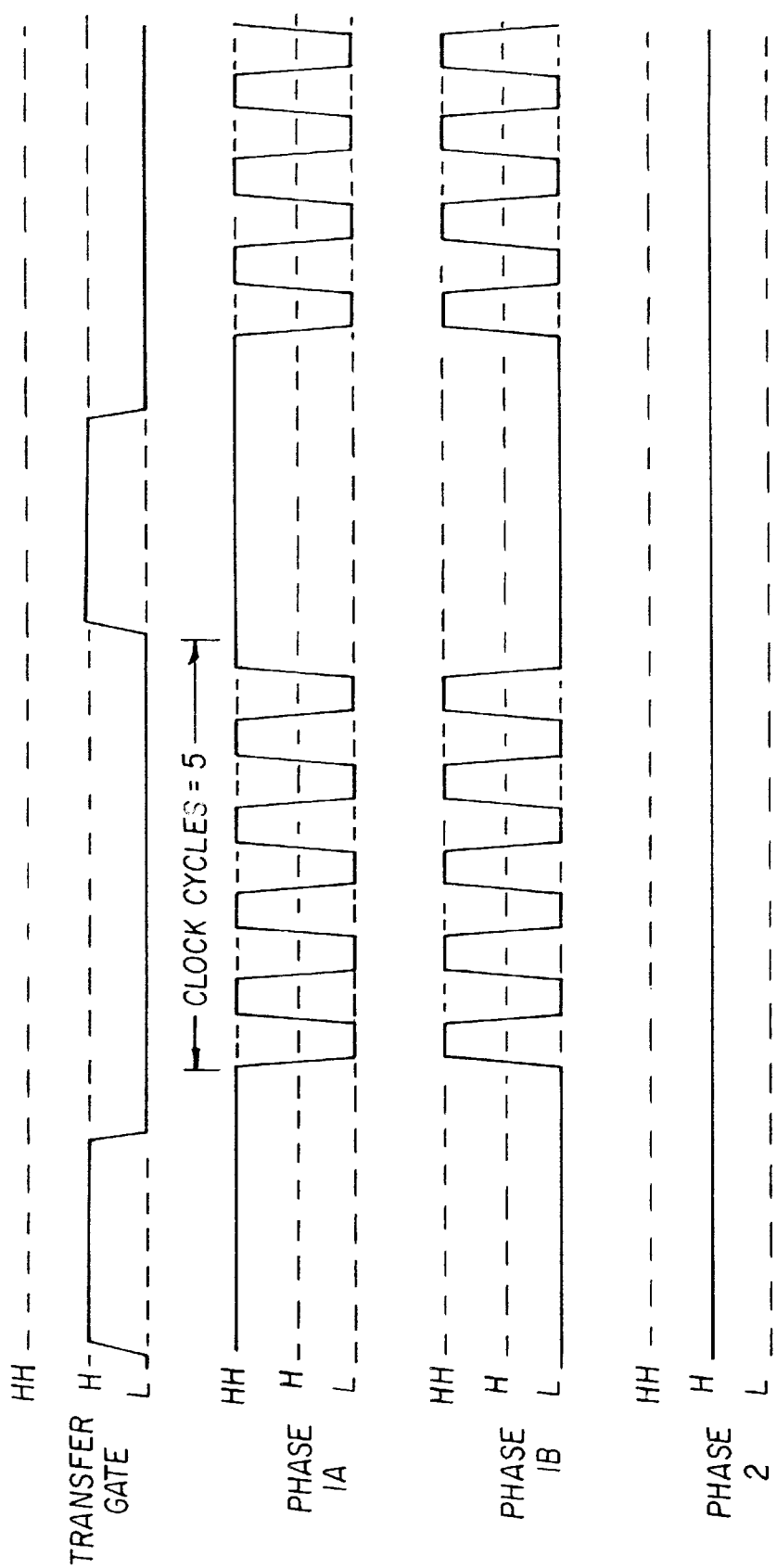
FIG. 6 is a timing diagram for the half resolution clocking of the present invention as shown in FIG. 2A.

FIG. 6 illustrates the timing typically required to operate the linear imager in FIG. 2A in a reduced resolution mode. By using clocking waveforms as illustrated in FIG. 6, the electron charge from adjacent photosites will be summed together, yielding an image with ½ the spatial resolution in the direction parallel to the photosite array (i.e., the cross track direction). As depicted in FIGS. 2B and 2C, the ½ spatial resolution image is read out of the imager in ~½ the time required to read out the full resolution image.

Figure 7:
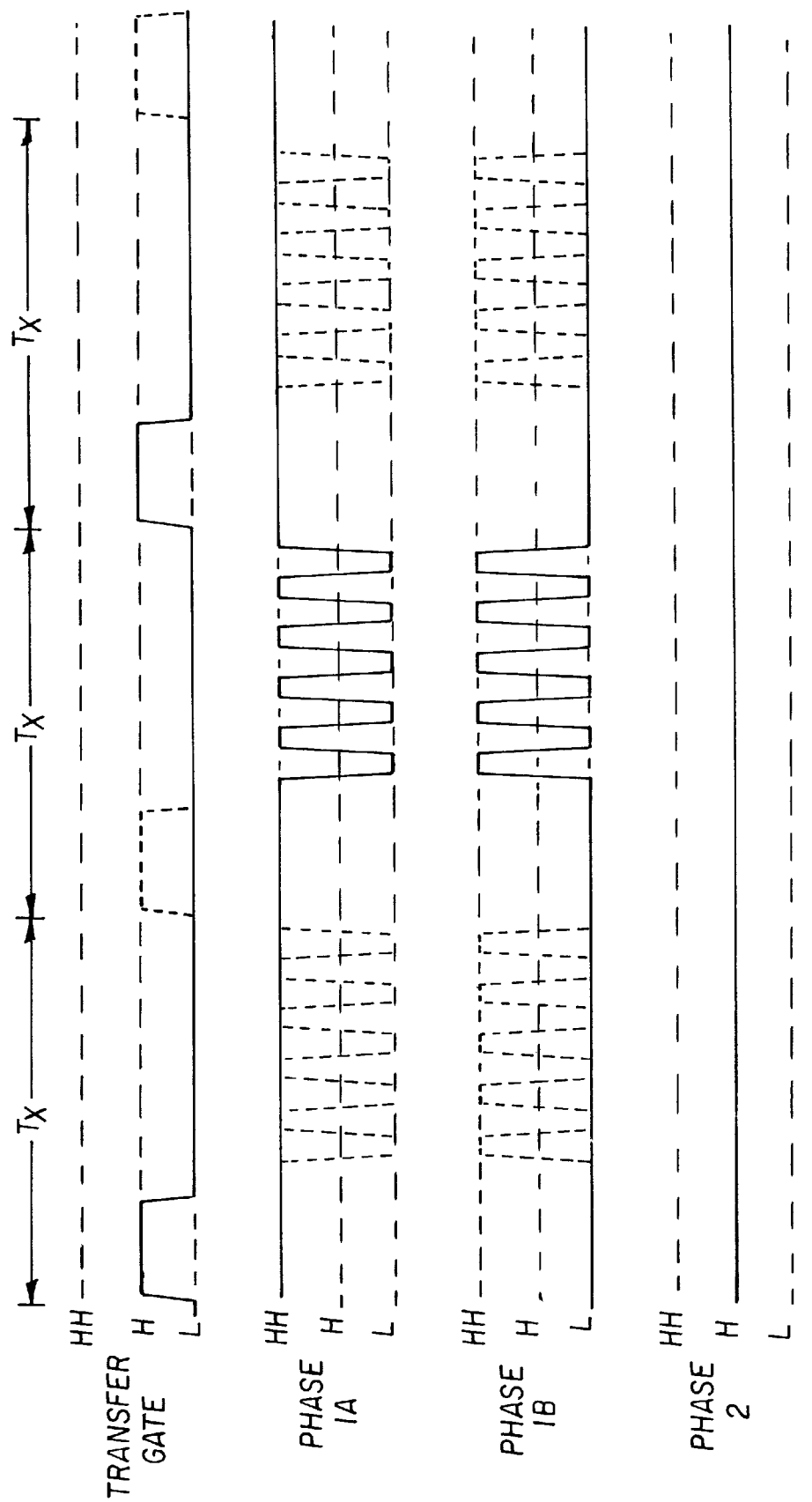
FIG. 7 is a timing diagram used to implement a one half resolution scheme in the scanning direction.

By operating the imager in FIG. 2A with the timing shown in FIG. 7, an image with ½ the spatial resolution will be obtained in both the cross-track and along-track scan directions. Here, by inhibiting the clocking of transfer gates 16 for half the readout lines, as shown by the dotted waveforms in FIG. 7, the pixel signal is summed in the scan direction. Therefore, the timing of FIG. 7 can be combined with the concepts of the present invention previously discussed to yield an imager with one half spatial resolution in both directions, yielding a quarter resolution.

The invention has been described in detail with particular reference to certain preferred embodiments thereof, but it will be understood that variations and modifications can be effected within the spirit and scope of the invention.

PARTS LIST 10 linear sensor
12 photosites
14 transfer gate
16 CCD
18 output amplifier

What is claimed is:

1. A linear image sensor comprising:
   a linear array of photosites
   a charge coupled device (CCD) having at least two phases for each of the photosites,
   a transfer gate between the array of photosites and the CCD;
   an output amplifier situated at the end of the CCD; and
   at least one of the phases being divided into a split phase having at least two sets of electrically isolated gates,
   means for operating the split phase as a single phase; and
   means for operating the sensor in a reduced resolution mode; wherein the reduced resolution mode further comprises means for summing charge packets from adjacent photosites.

2. The linear sensor of claim 1 wherein the means for operating the sensor in a reduced resolution mode further comprises operating the split phase as essentially two alternating phases operating with the split phase that is not split being held at a D. C potential.

3. The linear sensor of claim 1 wherein the split phase is divided such that a first clock is applied to the CCD cells corresponding to an even set of photosites and a second clock is applied to the CCD cells corresponding to an odd set of photosites.

4. A method of making a linear image sensor comprising the steps of:
   providing a linear array having a plurality of photosites with a charge coupled device (CCD) having at least two phases including an implanted barrier region for forming a two-phase architecture for each of the photosites adjacent to the array and a transfer gate between the array of photosites and the CCD with an output amplifier situated at the end of the CCD; and
   dividing at least one of the phases into a sub-phase having at least two sets of electrically isolated gates.

5. The method of claim 4 further comprising the step of operating the sub-phase as a single phase.

6. The method of claim 4 further comprising the step of operating the sensor in a reduced resolution mode.

7. An image sensing device comprising:
   at least one array of photosites;
   a charge coupled device (CCD) adjacent to the array, the CCD having at least two phases for each of the photosites;
   a transfer gate operatively coupling transfer of charge stored in the photosites of the array to the CCD under control of a transfer gate signal;
   an output amplifier operatively coupled to the CCD;
   at least one of the phases being a split phase that is divided among two separate clocks; and
   means for operating the sensor in a reduced mode; wherein the reduced resolution mode further comprises means for summing charge packets from adjacent photosites.

8. The image sensing device of claim 7 further comprising means for operating the split phase as a single phase.

9. The image sensing device of claim 8 wherein the array further comprises a linear array.

10. The image sensing device of claim 8 where the at least one array is a two dimensional array having a series of rows and columns with each column of photosites having its own CCD, each of the CCDs having a split phase.

11. The image sensing device of claim 10 further comprising a horizontal shift register coupled to each of the CCDs and the output amplifier is coupled to the end of the horizontal shift register.

12. The image sensing device of claim 11 wherein the horizontal shift has a split phase.

13. The linear sensor of claim 7 wherein the means for operating the sensor in a reduced resolution mode further comprises operating the split phase as essentially two alternating phases with the phase that is not split being held at a D. C potential.

14. The linear sensor of claim 7 wherein the split phase is divided such that a first clock is applied to the CCD cells corresponding to an even set of photosites and a second clock is applied to the CCD cells corresponding to an odd set of photosites.

* * * * *